(12) United States Patent
Tokunaga et al.

(10) Patent No.: US 10,473,220 B2
(45) Date of Patent: Nov. 12, 2019

(54) SLIDE COMPONENT

(71) Applicant: EAGLE INDUSTRY CO., LTD., Minato-Ku, Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Takeshi Hosoe, Tokyo (JP); Hidetoshi Kasahara, Tokyo (JP); Takafumi Ota, Tokyo (JP); Keiichi Chiba, Tokyo (JP); Masatoshi Itadani, Tokyo (JP); Hikaru Katori, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 10 days.

(21) Appl. No.: 15/736,201

(22) PCT Filed: May 13, 2016

(86) PCT No.: PCT/JP2016/064251
§ 371 (c)(1),
(2) Date: Dec. 13, 2017

(87) PCT Pub. No.: WO2016/203878
PCT Pub. Date: Dec. 22, 2016

(65) Prior Publication Data
US 2018/0172162 A1     Jun. 21, 2018

(30) Foreign Application Priority Data

Jun. 15, 2015   (JP) .................................. 2015-119942

(51) Int. Cl.
*F16J 15/40*     (2006.01)
*F16J 15/34*     (2006.01)
(Continued)

(52) U.S. Cl.
CPC ............. *F16J 15/34* (2013.01); *F16C 17/102* (2013.01); *F16C 33/107* (2013.01); *F16C 2360/24* (2013.01)

(58) Field of Classification Search
CPC ...... F16J 15/34; F16J 15/3412; F16J 15/3424; F16C 17/102; F16C 33/107; F16C 2360/24
See application file for complete search history.

(56) References Cited

U.S. PATENT DOCUMENTS 6,152,452 A    11/2000 Wang
7,052,016 B2 *  5/2006 Tejima ................ F16J 15/3404
                                              277/399
(Continued)

FOREIGN PATENT DOCUMENTS

EP      2626604 A1   8/2013
EP      3112078 A1   1/2017
(Continued)

OTHER PUBLICATIONS

International Search Report (ISR) dated Jul. 12, 2016, issued for International application No. PCT/JP2016/064251.
(Continued)

*Primary Examiner* — Gilbert Y Lee
(74) *Attorney, Agent, or Firm* — Law Office of Katsuhiro Arai

(57) ABSTRACT

In an embodiment, in a slide component, dynamic pressure generation grooves 10 are provided on a sealing face of at least one of a pair of slide parts 4, 7 so as to be isolated with no communication from the sealed fluid side and the leakage side by land portions R of both the sealing faces, and a plurality of independently-formed minute recessed sections 11 is provided at positions on the sealing face IS between the dynamic pressure generation grooves 10 and the leakage side, the positions being separated in the radial direction (Continued)

from the dynamic pressure generation grooves. The slide component can make the sealing faces fluid-lubricant and low frictional and prevent leakage of a sealed fluid and incoming of dust to the sealing faces at the time of normal operation.

20 Claims, 9 Drawing Sheets

(51) Int. Cl.
  *F16C 17/10* (2006.01)
  *F16C 33/10* (2006.01)

(56) References Cited

U.S. PATENT DOCUMENTS

| | | | | |
|---|---|---|---|---|
| 7,500,676 | B2* | 3/2009 | Tejima | F16J 15/3424 |
| | | | | 277/399 |
| 9,587,745 | B2* | 3/2017 | Itadani | F16J 15/3412 |
| 9,765,892 | B2* | 9/2017 | Itadani | F16J 15/34 |
| 10,054,230 | B2* | 8/2018 | Katori | F16J 15/34 |
| 2005/0212217 | A1* | 9/2005 | Tejima | F16J 15/3412 |
| | | | | 277/399 |
| 2013/0209011 | A1* | 8/2013 | Tokunaga | F16C 17/045 |
| | | | | 384/123 |
| 2015/0115537 | A1 | 4/2015 | Tokunaga | |
| 2015/0184752 | A1 | 7/2015 | Itadani | |
| 2016/0033045 | A1 | 2/2016 | Itadani et al. | |

FOREIGN PATENT DOCUMENTS

| | | |
|---|---|---|
| EP | 3163134 A1 | 5/2017 |
| JP | S6231775 A | 2/1987 |
| JP | S62117360 U | 7/1987 |
| JP | 2001012610 A | 1/2001 |
| JP | WO2014050920 A1 | 8/2016 |
| JP | WO2014103631 A1 | 1/2017 |
| JP | WO2014174725 A1 | 2/2017 |

OTHER PUBLICATIONS

Extended European Search Report (EESR) dated Jan. 24, 2019, issued for European counterpart patent application No. EP16811353. 8. (8 pages).

* cited by examiner

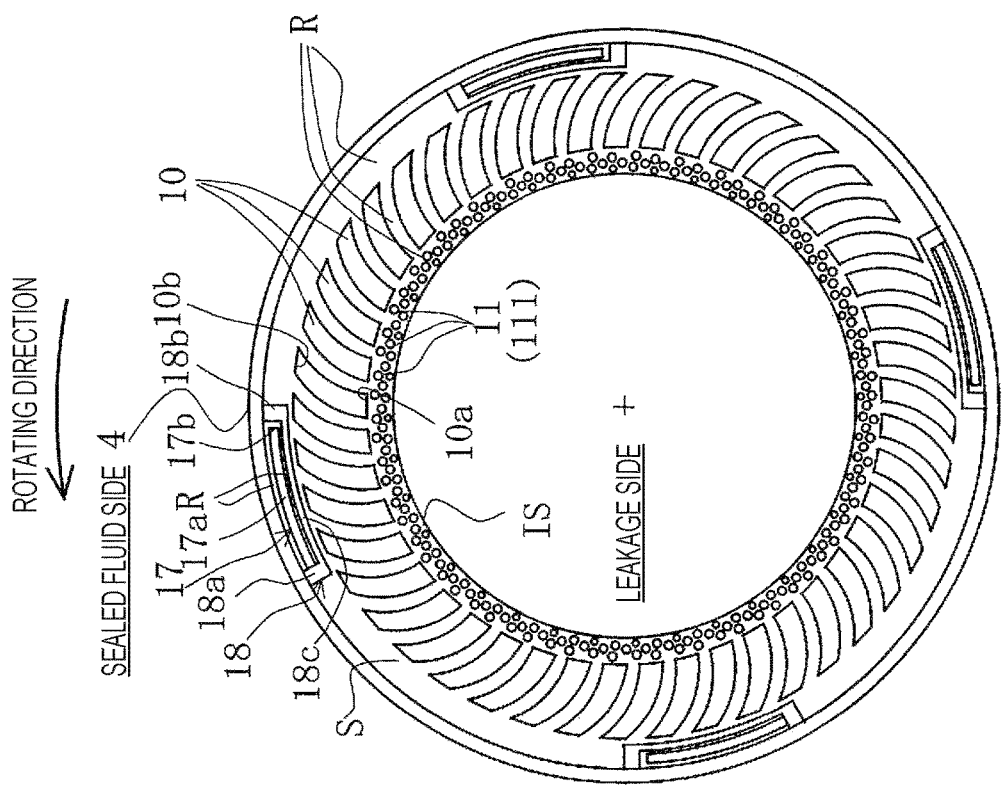
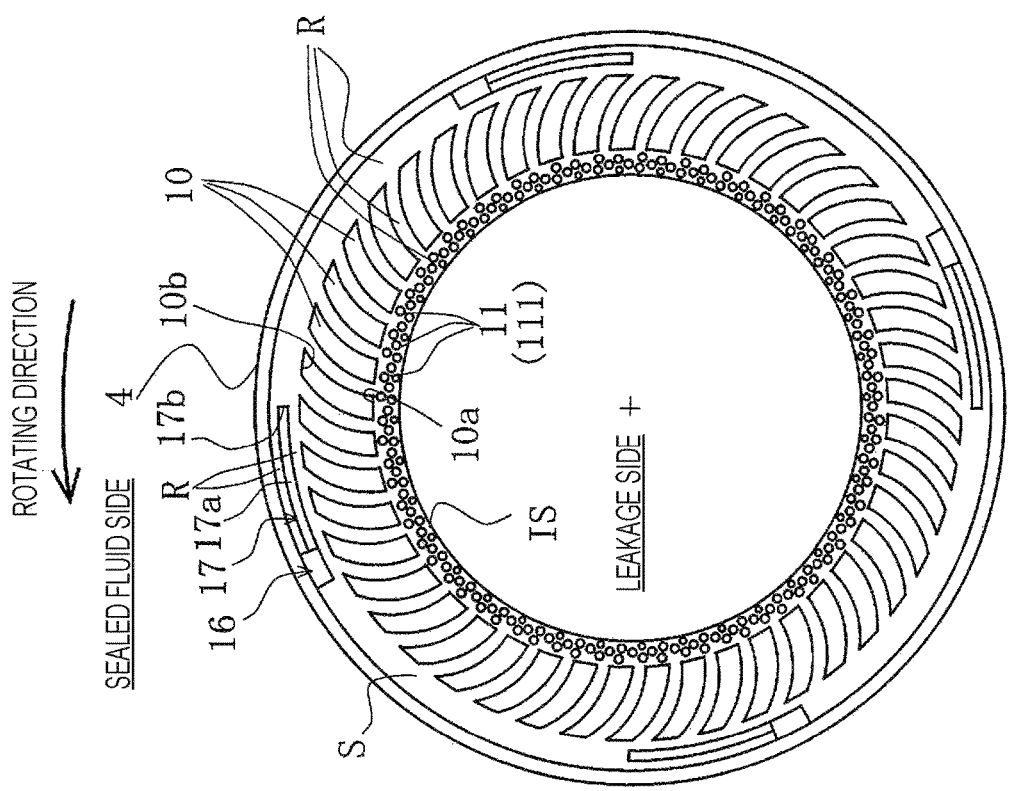
FIG. 8 (a)
FIG. 8 (b)

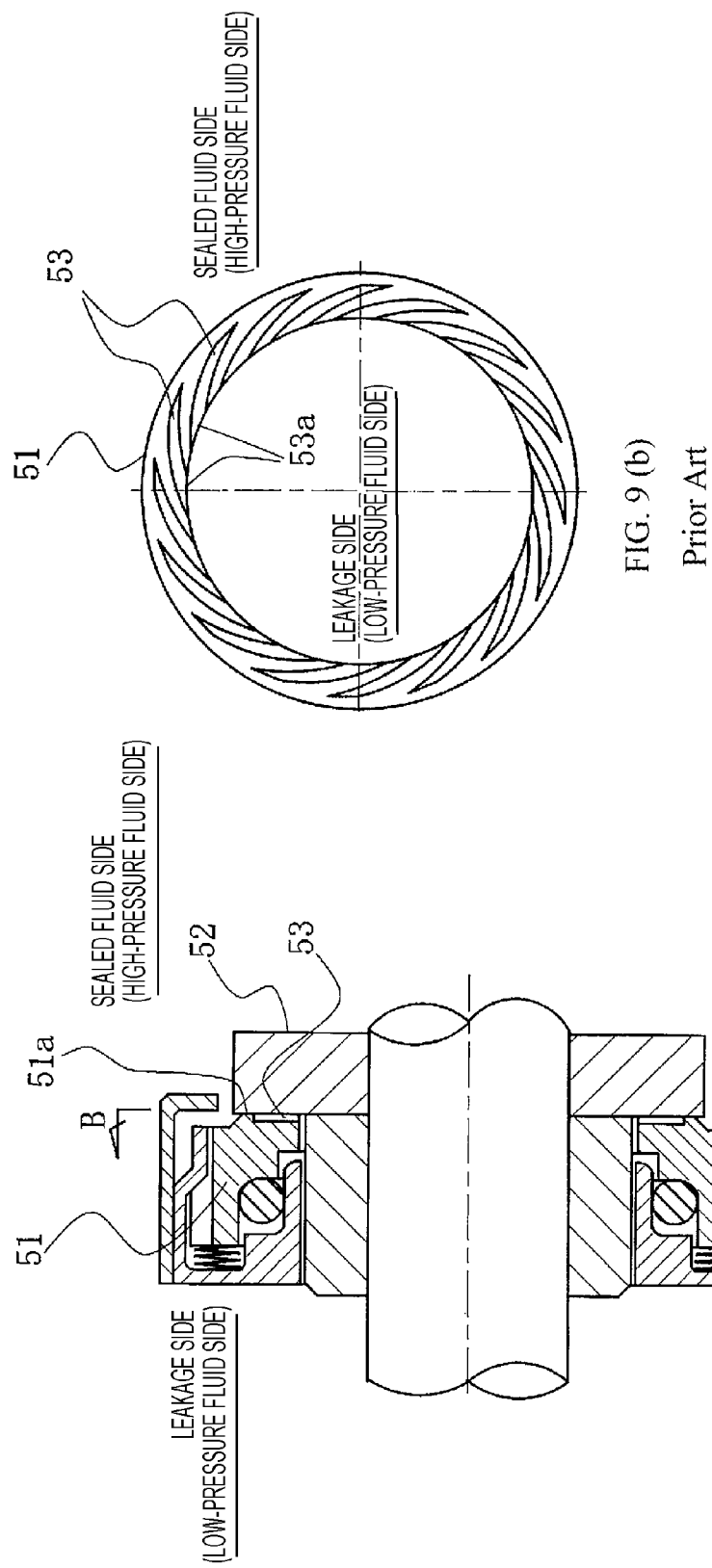
FIG. 9 (b) Prior Art
FIG. 9 (a) Prior Art

SLIDE COMPONENT

TECHNICAL FIELD

The present invention relates to slide components suitable for a mechanical seal, a bearing, and other slide units for example. In particular, the present invention relates to slide components of seal rings in which a fluid lies on sealing faces to reduce friction and there is a need for preventing fluid leakage from the sealing faces, for example, an oil seal to be used for a turbocharger or aircraft engine gear box, a bearing, or the like.

BACKGROUND ART

In a mechanical seal serving as one example of the slide components, performances thereof are evaluated by a leakage rate, a wear rate, and torque. In the prior art, the performances are enhanced by optimizing seal material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

Under such circumstances, for example, as a device to be utilized in an oil seal device for a rotating part such as a turbocharger, there is a known device including a rotating shaft rotatably accommodated in a housing, a disc shape rotor to be rotated together with the rotating shaft, and a disc shape stationary body abutted with an end face of the rotor for preventing leakage of oil from the outer peripheral side to the inner peripheral side, in which an annular groove that generate positive pressure by centrifugal force of a fluid is provided on an abutment face of the stationary body, so as to prevent the oil from leaking out from the outer peripheral side to the inner peripheral side (for example, refer to Patent Document 1).

In addition, for example, there is a known seal device of a rotating shaft that seals a poisonous fluid, the seal device including a rotating ring and a stationary ring attached to a casing together with the rotating shaft, in which spiral grooves that catch and bring a liquid on the low-pressure side toward the high-pressure side by rotation of the rotating ring are provided on a sealing face of any of the rotating ring and the stationary ring in such a manner that ends on the high-pressure side are formed as dead ends, so as to prevent a sealed fluid on the high-pressure side from leaking out to the low-pressure side (for example, refer to Patent Document 2).

In addition, for example, as a surface seal structure suitable for sealing a drive shaft of a turbocharger with respect to a compressor housing, there is a known structure in which one of a pair of cooperating seal rings is provided in a rotating constituent element and the other seal ring is provided in a stationary constituent element, these seal rings have seal faces formed substantially in the radial direction during operation, a seal gap for sealing outer regions of the seal faces with respect to inner regions of the seal faces is formed between the seal faces, a plurality of recessed sections separated in the circumferential direction, the recessed sections being effective for feeding a gas in is provided on at least one of the seal faces, the recessed sections are extended from one peripheral edge of the seal face toward the other peripheral edge, and inner ends of the recessed sections are separated from the other peripheral edge of the seal face in the radial direction, so that a non-gas component in a gas medium containing the non-gas component is sealed (for example, refer to Patent Document 3).

CITATION LIST

Patent Document

Patent Document 1: JP62-117360 U
Patent Document 2: JP62-31775 A
Patent Document 3: JP2001-12610 A

SUMMARY OF THE INVENTION

Problem to be Solved by the Invention

However, in the prior art described in Patent Documents 1 to 3 above, for example as shown in FIG. 9, on a sealing face 51a of a stationary ring 51, leakage-side ends 53a of spiral grooves 53 that catch and bring a fluid on the low-pressure fluid side (hereinafter, sometimes referred to as the "leakage side") toward the sealed fluid side (high-pressure fluid side) by rotation of a rotating ring 52 are directly open to the leakage side. Thus, in the vicinity of opening parts, dust may forcibly be pulled into the sealing faces by relative sliding between the sealing face of the stationary ring 51 and the sealing face of the rotating ring 52. The pulled dust is ground and smashed by relative sliding of both the sealing faces so as to more easily come into a part between both the sealing faces. Thus, there is a problem that surface damage such as wear of both the sealing faces is promoted.

An objective of the present invention is to provide a component capable of making sealing faces of a pair of slide parts that relatively slide on each other fluid-lubricant and low frictional and preventing leakage of a sealed fluid and incoming of dust to the sealing faces at the time of normal operation, so that contradictory functions of sealing and lubrication of the sealing faces are both improved.

Means for Solving Problem

In order to achieve the foregoing objective, a slide component according to a first aspect of the present invention includes a pair of slide parts that relatively slide on each other, one of the slide part being a stationary-side seal ring and the other slide part being a rotating-side seal ring, the seal rings having sealing faces formed in the radial direction to seal leakage of a sealed fluid, characterized in that a dynamic pressure generation groove is provided on the sealing face of at least one of the pair of slide parts so as to be isolated with no communication from the sealed fluid side and the leakage side by land portions of both the sealing faces, and a plurality of independently-formed minute recessed sections is provided at positions on the sealing face between the dynamic pressure generation groove and the leakage side, the positions being separated in the radial direction from the dynamic pressure generation groove.

According to this aspect, the slide component capable of making the sealing faces fluid-lubricant and low frictional and preventing incoming of dust mixed in the fluid on the leakage side to the sealing faces at the time of normal operation, so that contradictory functions of sealing and lubrication of the sealing faces are both improved can be provided. The dynamic pressure generation groove is isolated from the sealed fluid side by the land portions, and the minute recessed sections are arranged at the positions separated in the radial direction from the dynamic pressure generation groove and formed to be independent from each other. Thus, no leakage is generated even in a static state.

A slide component according to a second aspect of the present invention includes a pair of slide parts that relatively slide on each other, one of the slide parts being a stationary-side seal ring and the other slide part being a rotating-side seal ring, the seal rings having sealing faces formed in the radial direction to seal leakage of a liquid or a misty fluid serving as a sealed fluid, characterized in that a dynamic pressure generation groove is provided on the sealing face of at least one of the pair of slide parts so as to be isolated with no communication from the sealed fluid side and the leakage side by land portions of both the sealing faces, and a plurality of independently-formed minute recessed sections is provided at positions on the sealing face between the dynamic pressure generation groove and the leakage side, the positions being separated in the radial direction from the dynamic pressure generation groove.

According to this aspect, the slide component capable of making the sealing faces fluid-lubricant and low frictional and preventing leakage of the liquid serving as the sealed fluid and incoming of dust existing in the fluid on the leakage side to the sealing faces at the time of normal operation, so that contradictory functions of sealing and lubrication of the sealing faces are both improved can be provided. The dynamic pressure generation groove is isolated from the side of the liquid serving as the sealed fluid by the land portions, and the minute recessed sections are arranged at the positions separated in the radial direction from the dynamic pressure generation groove and formed to be independent from each other. Thus, no leakage is generated even in a static state.

A third aspect of the slide component of the present invention relates to the first or second aspect, characterized in that the dynamic pressure generation groove is formed in a spiral shape to suction the fluid on the leakage side and pump the fluid to the sealed fluid side.

According to this aspect, the fluid on the leakage side is pumped to the sealed fluid side at the time of normal operation, so that the sealed fluid is prevented from leaking out to the leakage side.

A fourth aspect of the slide component of the present invention relates to any of the first to third aspects, characterized in that the independently-formed minute recessed sections are formed by dimples.

According to this aspect, manufacture can be more easily made.

A fifth aspect of the slide component of the present invention relates to any of the first to third aspects, characterized in that the independently-formed minute recessed sections are formed by herringbone grooves.

According to this aspect, a larger dynamic pressure effect can be obtained.

A sixth aspect of the slide component of the present invention relates to any of the first to third aspects, characterized in that the independently-formed minute recessed sections are formed by groove sections that form Rayleigh step mechanisms.

According to this aspect, the groove sections can be efficiently arranged, so that a larger dynamic pressure effect can be obtained.

A seventh aspect of the slide component of the present invention relates to any of the first to sixth aspects, characterized in that the dynamic pressure generation groove is formed in such a manner that a leakage-side end is extended long in the circumferential direction in comparison to a sealed fluid-side end, and a leakage-side opening part is enlarged.

According to this aspect, the leakage-side end a of the dynamic pressure generation groove does not communicate with the leakage side, and incoming of dust mixed in the fluid on the leakage side to the dynamic pressure generation groove is suppressed, so that an effect of supplying the fluid to the dynamic pressure generation groove can be increased.

An eighth aspect of the slide component of the present invention relates to any of the first to seventh aspects, characterized in that a fluid introduction groove communicating with the sealed fluid side and not communicating with the leakage side is provided on the sealing face of at least one of the pair of slide parts. Thereby, in a state where the rotating-side seal ring is rotated at low speed such as the time of start-up, the liquid existing on the outer peripheral side of the sealing faces is actively introduced to the sealing faces so as to lubricate the sealing faces.

When the rotating-side seal ring is rotated at high speed such as normal operation, the liquid introduced from the fluid introduction groove to the sealing faces is discharged by centrifugal force. Thus, the liquid does not leak out to the inner peripheral side which is the leakage side.

Effect of the Invention

The present invention exhibits the following superior effects.

(1) The slide component including the pair of slide parts that relatively slide on each other, one of the slide parts being the stationary-side seal ring and the other slide part being the rotating-side seal ring, the seal rings having the sealing faces formed in the radial direction to seal the leakage of the sealed fluid, is characterized in that the dynamic pressure generation groove is provided on the sealing face of at least one of the pair of slide parts so as to be isolated with no communication from the sealed fluid side and the leakage side by the land portions of both the sealing faces, and the plurality of independently-formed minute recessed sections is provided at the positions on the sealing face between the dynamic pressure generation groove and the leakage side, the positions being separated in the radial direction from the dynamic pressure generation groove. Thereby, the slide component capable of making the sealing faces fluid-lubricant and low frictional and preventing incoming of dust mixed in the fluid on the leakage side to the sealing faces at the time of normal operation, so that contradictory functions of sealing and lubrication of the sealing faces are both improved can be provided. The dynamic pressure generation groove is isolated from the sealed fluid side by the land portions, and the minute recessed sections are arranged at the positions separated in the radial direction from the dynamic pressure generation groove and formed to be independent from each other. Thus, no leakage is generated even in a static state.

(2) The slide component including the pair of slide parts that relatively slide on each other, one of the slide parts being the stationary-side seal ring and the other slide part being the rotating-side seal ring, the seal rings having the sealing faces formed in the radial direction to seal the leakage of the liquid or the misty fluid serving as the sealed fluid, is characterized in that the dynamic pressure generation groove is provided on the sealing face of at least one of the pair of slide parts so as to be isolated with no communication from the sealed fluid side and the leakage side by the land portions of both the sealing faces, and the plurality of independently-formed minute recessed sections is provided at the positions on the sealing face between the dynamic pressure generation groove and the leakage side, the positions being separated in the radial direction from the dynamic pressure generation groove. Thereby, the slide component capable of making the sealing faces fluid-lubricant and low frictional and preventing the leakage of the liquid serving as the sealed fluid and incoming of dust existing in the fluid on the leakage side to the sealing faces at the time of normal operation, so that contradictory functions of sealing and lubrication of the sealing faces are both improved can be provided. The dynamic pressure generation groove is isolated from the side of the liquid serving as the sealed fluid by the land portions, and the minute recessed sections are arranged at the positions separated in the radial direction from the dynamic pressure generation groove and formed to be independent from each other. Thus, no leakage is generated even in a static state.

(3) The dynamic pressure generation groove is formed in a spiral shape to suction the fluid on the leakage side and pump the fluid to the sealed fluid side. Thereby, the fluid on the leakage side is pumped to the sealed fluid side at the time of normal operation, so that the sealed fluid is prevented from leaking out to the leakage side.

(4) The independently-formed minute recessed sections are formed by the dimples. Thereby, the manufacture can be more easily made.

(5) The independently-formed minute recessed sections are formed by the herringbone grooves. Thereby, the larger dynamic pressure effect can be obtained.

(6) The independently-formed minute recessed sections are formed by the groove sections that form the Rayleigh step mechanisms. Thereby, the groove sections can be efficiently arranged, so that the larger dynamic pressure effect can be obtained.

(7) The dynamic pressure generation groove is formed in such a manner that the leakage-side end is extended long in the circumferential direction in comparison to the sealed fluid-side end, and the leakage-side opening part is enlarged. Thereby, the leakage-side end a of the dynamic pressure generation groove does not communicate with the leakage side, and incoming of dust mixed in the fluid on the leakage side to the dynamic pressure generation groove is suppressed, so that the effect of supplying the fluid to the dynamic pressure generation groove can be increased.

(8) The fluid introduction groove communicating with the sealed fluid side and not communicating with the leakage side is provided on the sealing face of at least one of the pair of slide parts. Thereby, in a state where the rotating-side seal ring is rotated at low speed such as the time of start-up, the liquid existing on the outer peripheral side of the sealing faces is actively introduced to the sealing faces so as to lubricate the sealing faces.

When the rotating-side seal ring is rotated at high speed such as normal operation, the liquid introduced from the fluid introduction groove to the sealing faces is discharged by centrifugal force. Thus, the liquid does not leak out to the inner peripheral side which is the leakage side.

BRIEF DESCRIPTION OF THE DRAWINGS

FIG. 8 is a view showing one of sealing faces of a slide component according to a fifth embodiment of the present invention, the view corresponding to FIG. 3 of the first embodiment; and FIG. 9 is an illustrative view for explaining the prior art: FIG. 9($a$) is a vertically sectional view and FIG. 9($b$) is a sectional view taken along the arrows B-B.

DESCRIPTION OF EMBODIMENTS

Hereinafter, with reference to the drawings, modes for implementing this invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

With reference to FIGS. 1 to 4, a slide component according to a first embodiment of the present invention will be described.

It should be noted that in the following embodiments, a mechanical seal serving as one example of slide components will be described as an example. In the description, the outer peripheral side of the slide parts that form the mechanical seal serves as the sealed fluid side (liquid side or misty fluid side), and the inner peripheral side serves as the leakage side (gas side). However, the present invention is not limited to this but can also be applied to a case where the outer peripheral side serves as the leakage side (gas side), and the inner peripheral side serves as the sealed fluid side (liquid side or misty fluid side). Regarding a relationship in terms of high/low pressure between the sealed fluid side (liquid side or misty fluid side) and the leakage side (gas side), for example, the sealed fluid side (liquid side or misty fluid side) may be high pressure and the leakage side (gas side) may be low pressure or vice versa, or the pressure may be the same on both the sides.

Figure 1:
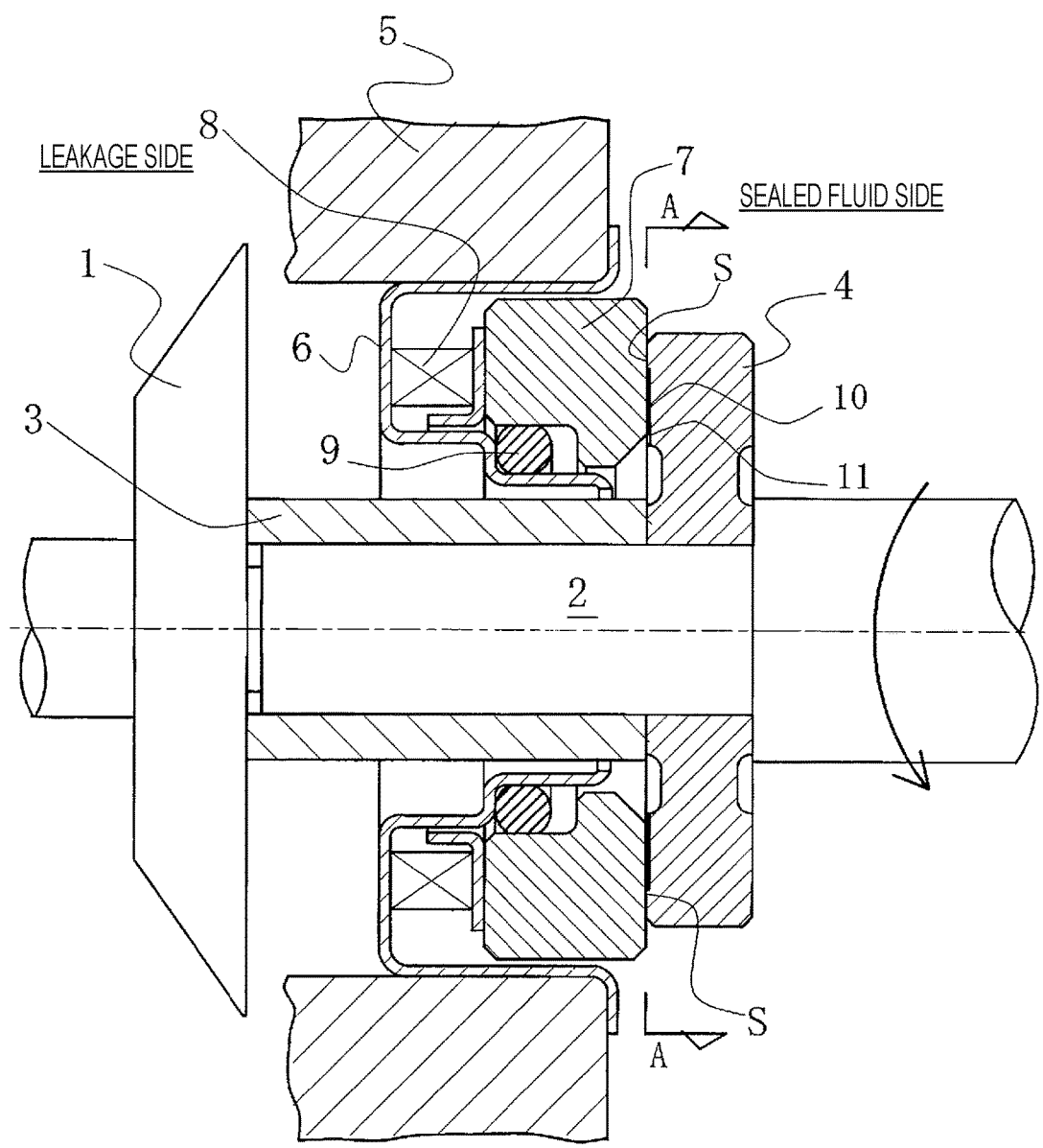
FIG. 1 is a vertically sectional view showing one example of a mechanical seal according to a first embodiment of the present invention.

FIG. 1 is a vertically sectional view showing one example of the mechanical seal that is an inside mechanical seal for sealing a sealed fluid leaking out from an outer periphery of a sealing face toward an inner periphery, for example, lubricating oil used for a bearing section. On the side of a rotating shaft 2 that drives an impeller 1 of a compressor provided in a turbocharger, an annular rotating-side seal ring 4 serving as one of the slide parts is provided via a sleeve 3 in a state where the rotating-side seal ring can be rotated integrally with this rotating shaft 2, an annular stationary-side seal ring 7 serving as the other slide part is provided in a housing 5 via a cartridge 6 in a state where the stationary-side seal ring is not rotated but can be moved in the axial direction, and sealing faces S mirror-finished by lapping or the like closely slide on each other by means of a coiled wave spring 8 that biases the stationary-side seal ring 7 in the axial direction. That is, in this mechanical seal, the rotating-side seal ring 4 and the stationary-side seal ring 7 have the sealing faces S formed in the radial direction to prevent the sealed fluid, for example, the liquid or the misty fluid (hereinafter, the liquid or the misty fluid will be sometimes simply called as the "liquid") from flowing out from an outer periphery of the sealing faces S toward an inner periphery on the sealing faces S.

It should be noted that the reference sign 9 denotes an O ring to seal a part between the cartridge 6 and the stationary-side seal ring 7.

The reference sign 10 denotes dynamic pressure generation grooves and the reference sign 11 denotes minute recessed sections. These will be described later in detail.

In this example, a case where the sleeve 3 and the rotating-side seal ring 4 are separate bodies is described. However, the present invention is not limited to this but the sleeve 3 and the rotating-side seal ring 4 may be formed as an integral body.

Material of the rotating-side seal ring 4 and the stationary-side seal ring 7 is selected from the group consisting of silicon carbide (SiC) excellent in wear resistance and carbon excellent in self-lubrication. For example, the following combinations are available: both the rings are made of SiC or one of the rings is made of SiC and the other is made of carbon.

Figure 2:
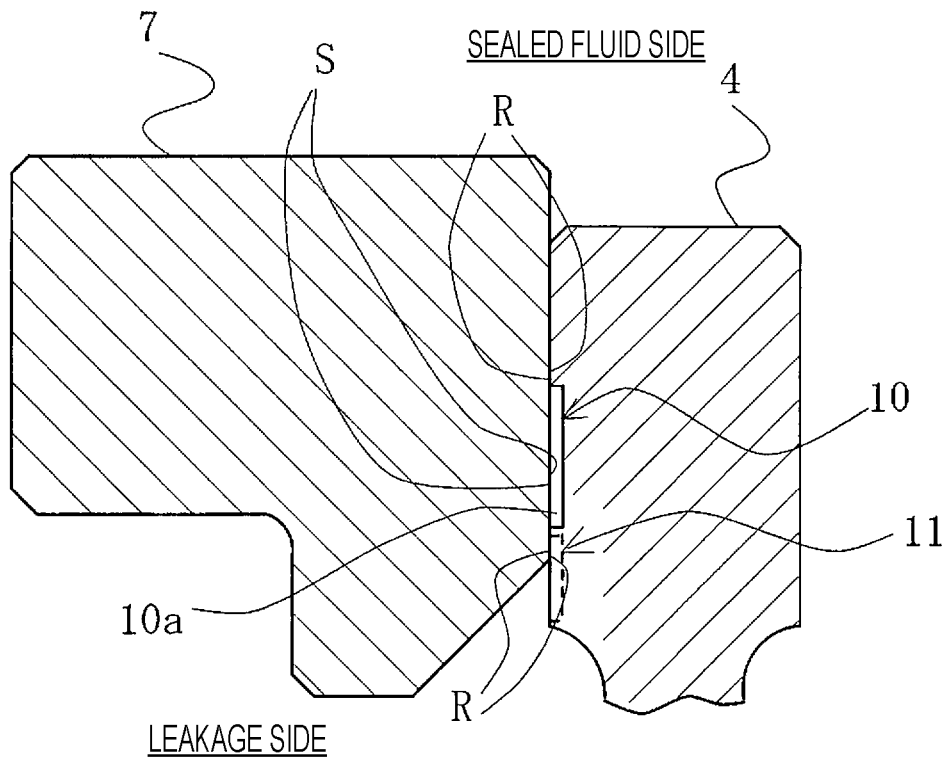
FIG. 2 is an enlarged view showing a sealing portion of a slide component according to the first embodiment of the present invention, in which rotation center exists in the horizontal direction in a lower part of a paper plane.

FIG. 2 is an enlarged view showing a sealing portion of the slide component according to the embodiment of the present invention.

In FIG. 2, the dynamic pressure generation grooves 10 are provided on the sealing face S of the rotating-side seal ring 4 so as to be isolated with no communication from the sealed fluid side and the leakage side by land portions R of the sealing faces of the rotating-side seal ring 4 and the stationary-side seal ring 7. That is, in this example, the dynamic pressure generation groove 10 is provided only on the sealing face S of the rotating-side seal ring 4. The land portion R exists on the leakage side and the sealed fluid side in the radial direction of the dynamic pressure generation groove 10. By bringing the land portion R of the sealing face S of the stationary-side seal ring 7 into sliding contact with the land portion R of this rotating-side seal ring 4, the dynamic pressure generation groove 10 is isolated with no communication from the sealed fluid side and the leakage side. In detail, the outer diameter of the sealing face S of the stationary-side seal ring 7 on the sealed fluid side is set to be greater in the radial direction than a sealed fluid-side end of the dynamic pressure generation groove 10 of the rotating-side seal ring 4, and the inner diameter of the sealing face S of the stationary-side seal ring 7 on the leakage side is set to be smaller in the radial direction than a leakage-side end of the dynamic pressure generation groove 10. By bringing the land portion R of the sealing face S of the stationary-side seal ring 7 and the land portion R on the inner diameter side and the outer diameter side of the dynamic pressure generation groove 10 of the rotating-side seal ring 4 into sliding contact with each other, the dynamic pressure generation groove 10 is isolated with no communication from the sealed fluid side and the leakage side.

Figure 3:
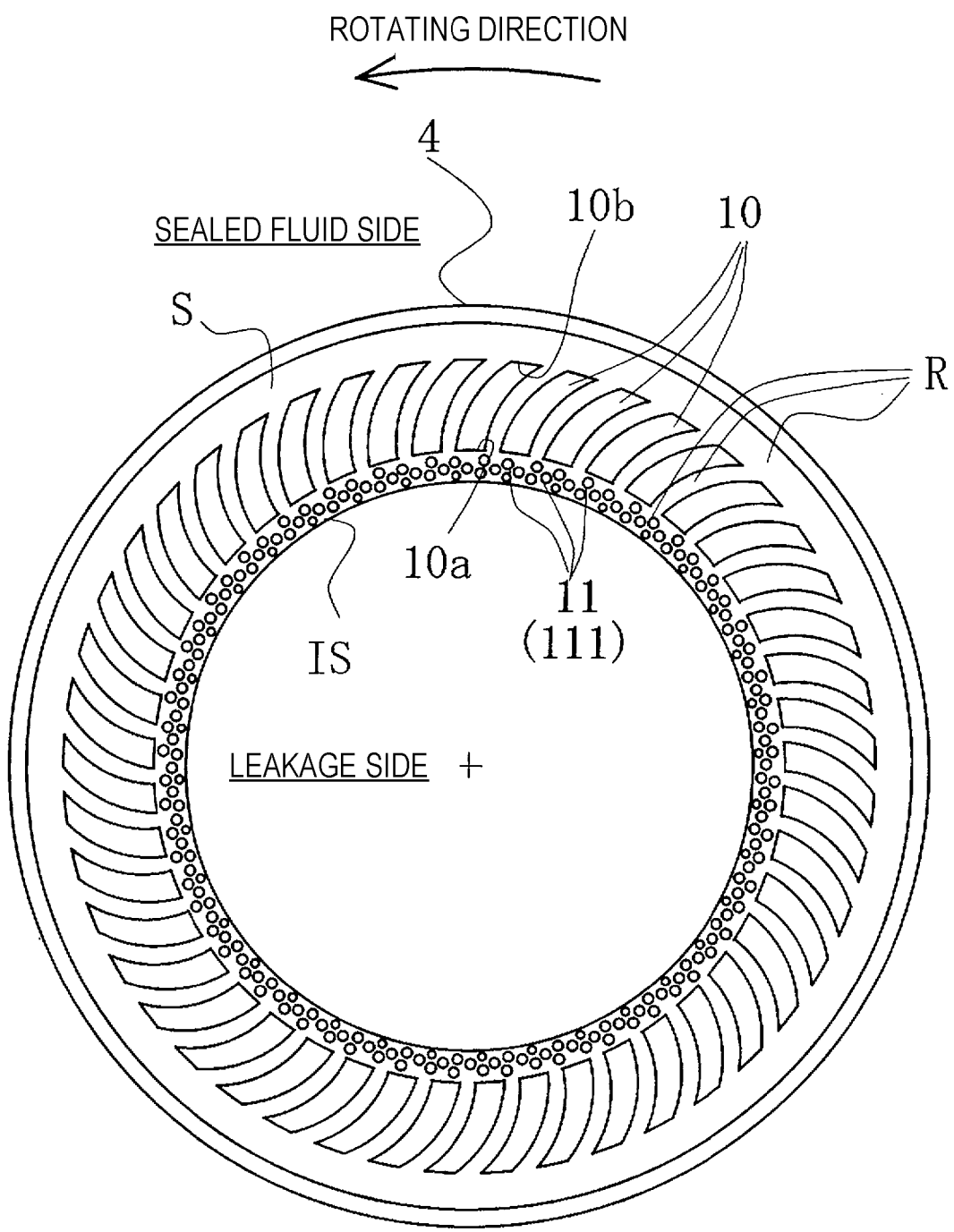
FIG. 3 is a sectional view taken along the arrows A-A of FIG. 1.

As shown in FIG. 3 as well, the plurality of independently-formed minute recessed sections 11 is provided on a sealing face IS between the leakage-side ends 10a of the dynamic pressure generation grooves 10 and the leakage side. The minute recessed sections 11 are arranged at positions separated in the radial direction from the leakage-side ends 10a of the dynamic pressure generation grooves 10, and do not communicate with the dynamic pressure generation grooves 10.

In FIG. 3, the minute recessed sections 11 are formed by substantially-circular dimples 111. The dimples 111 are arranged at random, and size thereof, for example, the diameter may be identical or non-identical.

In the present invention, the "minute recessed sections" indicate dents formed on the flat sealing face S, and the shape thereof is not particularly limited. For example, the planar shape of the dents includes various shapes such as a circular shape, an oval shape, an oblong shape, or a polygonal shape. The sectional shape of the dents also includes various shapes such as a bowl shape or a square.

A number of minute recessed sections 11 formed on the sealing face S also have a function of holding part of the liquid intervening between this sealing face S and the opposite sealing face that relatively slide as a hydrodynamic lubricant film so as to stabilize the lubricant film.

Figure 4:
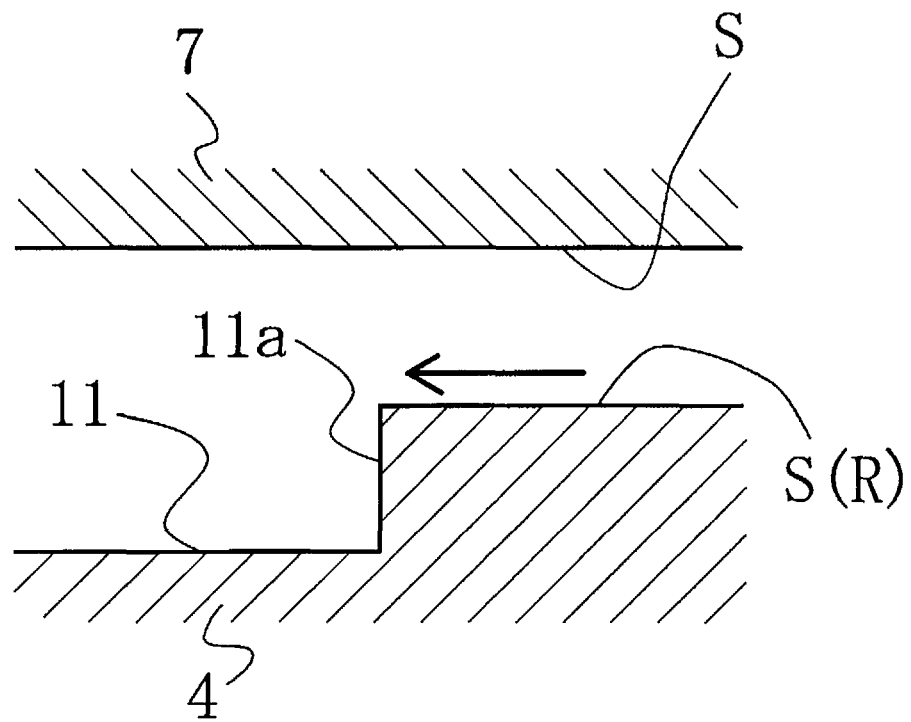
FIG. 4 is an illustrative view for explaining a function of minute recessed sections.

Each of the minute recessed sections 11 can be regarded as a section that forms a Rayleigh step as shown in FIG. 4.

In FIG. 4, a Rayleigh step 11a extending in the direction orthogonal to a cross-section of the figure is formed on the sealing face S (R) of the rotating-side seal ring 4, and the sealing face S of the stationary-side seal ring 7 is formed to be flat. When the rotating-side seal ring 4 relatively moves in the direction shown by the arrow, the fluid lying between both the sealing faces follows and moves in the arrow direction by viscosity thereof. At that time, due to existence of the Rayleigh steps 11a, dynamic pressure (positive pressure) is generated. By the generation of this dynamic pressure, a gap between both the sealing faces is slightly extended, and the fluid on the leakage side is easily suctioned into the dynamic pressure generation grooves 10.

As shown in FIG. 3, the dynamic pressure generation grooves 10 are to suction the fluid on the leakage side and pump the fluid to the sealed fluid side, and are formed for example in a spiral shape.

That is, since the land portion R exists on the leakage side and the sealed fluid side in the radial direction of the spiral dynamic pressure generation grooves 10, the dynamic pressure generation grooves 10 are isolated with no communication from the sealed fluid side and the leakage side. The dynamic pressure generation grooves are inclined in a spiral shape so as to exhibit an operation of pumping from the leakage-side ends 10a toward the sealed fluid-side ends 10b by relative sliding between the rotating-side seal ring 4 and the stationary-side seal ring 7, so as to generate dynamic pressure (positive pressure) in the ends 10b.

In a state where the rotating-side seal ring 4 is rotated at high speed such as normal operation, the spiral dynamic pressure generation grooves 10 suction a gas from the leakage side while being helped by an operation of the dimples 111, and generate dynamic pressure (positive pressure) in the vicinity of the sealed fluid-side ends 10b. Thus, a slight gap is formed between the sealing faces S of the rotating-side seal ring 4 and the stationary-side seal ring 7, so that the sealing faces S are brought into a gas lubricant state and becomes very low frictional.

As described above, the substantially-circular dimples 111 are arranged at the positions on the sealing face IS between the leakage-side ends 10a of the dynamic pressure generation grooves 10 and the leakage side, the positions being separated in the radial direction from the leakage-side ends 10a of the dynamic pressure generation grooves 10 and formed to be independent from each other. Thus, the leakage-side ends 10a of the dynamic pressure generation grooves 10 and the leakage side do not directly communicate with each other. Therefore, incoming of dust mixed in the fluid on the leakage side to the dynamic pressure generation grooves 10 can be suppressed.

According to the configuration of the first embodiment described above, the following effects will be exhibited.

(1) The dynamic pressure generation grooves 10 are provided on the sealing face S of at least one of the pair of slide parts (sealing face S of the rotating-side seal ring 4) so as to be isolated with no communication from the side of the liquid serving as the sealed fluid and the leakage side by the land portions R of both the sealing faces S, and the plurality of independently-formed dimples 111 that form the minute recessed sections 11 is provided at the positions on the sealing face IS between the dynamic pressure generation grooves 10 and the leakage side, the positions being separated in the radial direction from the dynamic pressure generation grooves 10. Thereby, the slide component capable of making the sealing faces fluid-lubricant and low frictional and preventing leakage of the liquid serving as the sealed fluid and incoming of dust existing in the fluid on the leakage side to the sealing faces at the time of normal operation, so that contradictory functions of sealing and lubrication of the sealing faces are both improved can be provided. The dynamic pressure generation grooves 10 are isolated from the side of the liquid serving as the sealed fluid by the land portions R, and the dimples 111 are arranged at the positions separated in the radial direction from the dynamic pressure generation grooves 10 and formed to be independent from each other. Thus, no leakage is generated even in a static state.

(2) The dynamic pressure generation grooves 10 are formed in a spiral shape to suction the fluid on the leakage side and pump the fluid to the side of the liquid serving as the sealed fluid. Thereby, the fluid on the leakage side is pumped to the side of the liquid serving as the sealed fluid at the time of normal operation, so that the liquid serving as the sealed fluid is prevented from leaking out to the leakage side.

(3) The independently-formed minute recessed sections 11 are formed by the substantially-circular dimples 111. Therefore, manufacture can be more easily made.

Second Embodiment

Figure 5:
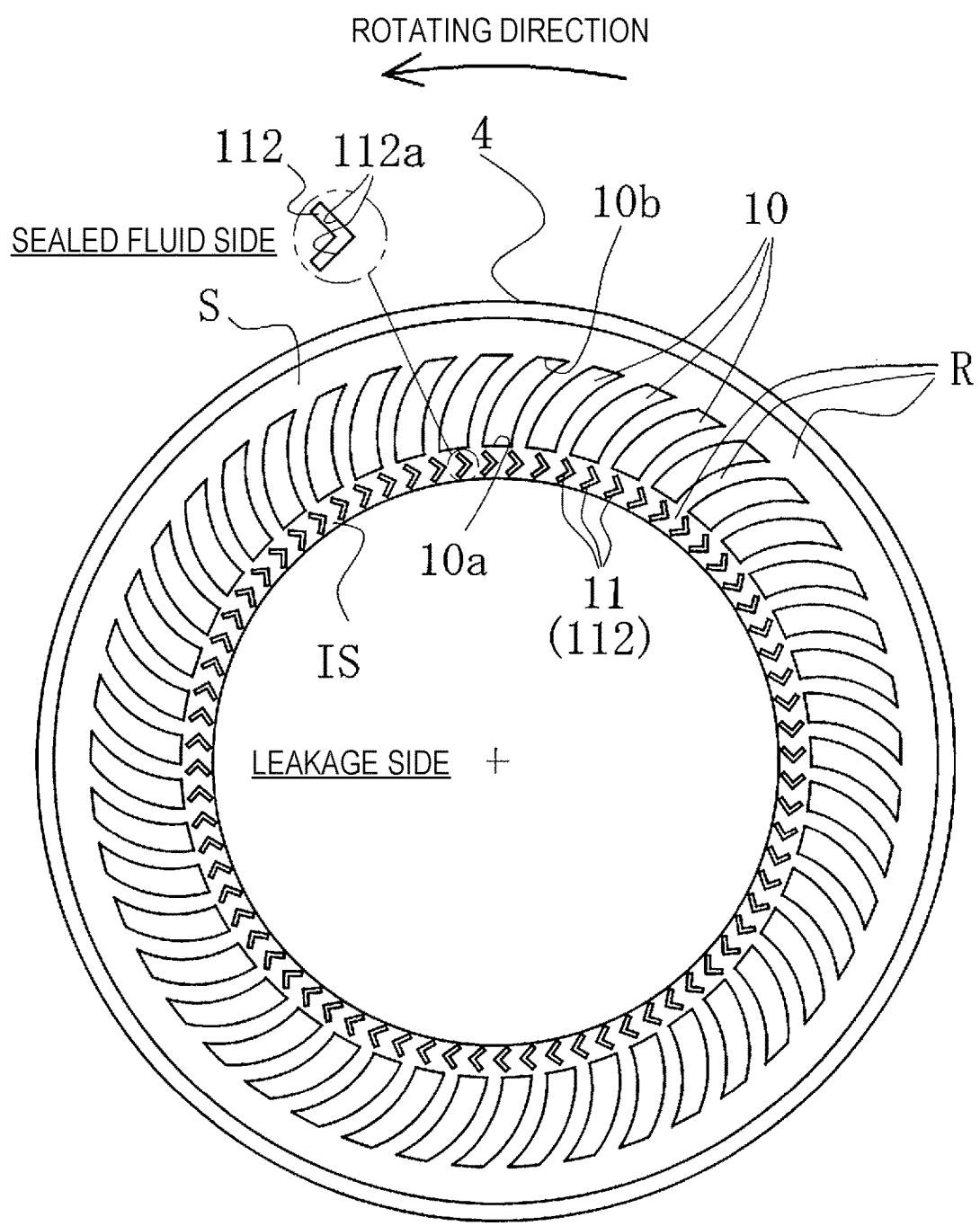
FIG. 5 is a view showing one of sealing faces of a slide component according to a second embodiment of the present invention, the view corresponding to FIG. 3 of the first embodiment.

With reference to FIG. 5, a slide component according to a second embodiment of the present invention will be described.

The slide component according to the second embodiment are different from the slide component of the first embodiment in terms of a configuration of independently-formed minute recessed sections 11 provided at positions on a sealing face between dynamic pressure generation grooves and the leakage side, the positions being separated in the radial direction from the dynamic pressure generation grooves. However, the other basic configurations are the same as the first embodiment. The same members will be given the same reference signs and duplicated description will be omitted.

In FIG. 5, a plurality of herringbone grooves 112 that form the independently-formed minute recessed sections 11 is provided on a sealing face IS between leakage-side ends 10a of dynamic pressure generation grooves 10 and the leakage side. The herringbone grooves 112 are arranged at positions separated in the radial direction from the leakage-side ends 10a of the dynamic pressure generation grooves 10.

The planar shape of the herringbone grooves 112 is a substantially L shape bent at right angle. Each of the herringbone grooves is arranged so as to be open toward the upstream side on the sealing face and the plurality of herringbone grooves is provided in the circumferential direction.

Each of the minute herringbone grooves 112 forms a Rayleigh step as shown in FIG. 4. When a rotating-side seal ring 4 relatively moves in the direction shown by the arrow, the fluid lying between both the sealing faces follows and moves in the arrow direction by viscosity thereof. At that time, due to existence of Rayleigh steps 112a of the herringbone grooves 112, dynamic pressure (positive pressure) is generated. By the generation of this dynamic pressure, a gap between both the sealing faces is slightly extended, and the fluid on the leakage side is easily suctioned into the dynamic pressure generation grooves 10.

According to the configuration of the second embodiment described above, the following effects will be exhibited.

(1) The dynamic pressure generation grooves 10 are provided on the sealing face S of at least one of the pair of slide parts (sealing face S of the rotating-side seal ring 4) so as to be isolated with no communication from the side of the liquid serving as the sealed fluid and the leakage side by land portions R of both the sealing faces S, and the plurality of independently-formed herringbone grooves 112 that form the minute recessed sections 11 is provided at the positions on the sealing face IS between the dynamic pressure generation grooves 10 and the leakage side, the positions being separated in the radial direction from the dynamic pressure generation grooves 10. Thereby, the slide component capable of making the sealing faces fluid-lubricant and low frictional and preventing leakage of the liquid serving as the sealed fluid and incoming of dust existing in the fluid on the leakage side to the sealing faces at the time of normal operation, so that contradictory functions of sealing and lubrication of the sealing faces are both improved can be provided. The dynamic pressure generation grooves 10 are isolated from the side of the liquid serving as the sealed fluid by the land portions R, and the herringbone grooves 112 are arranged at the positions separated in the radial direction from the dynamic pressure generation grooves 10 and formed to be independent from each other. Thus, no leakage is generated even in a static state.

(2) The dynamic pressure generation grooves 10 are formed in a spiral shape to suction the fluid on the leakage side and pump the fluid to the side of the liquid serving as the sealed fluid. Thereby, the fluid on the leakage side is pumped to the side of the liquid serving as the sealed fluid at the time of normal operation, so that the liquid serving as the sealed fluid is prevented from leaking out to the leakage side.

(3) The independently-formed minute recessed sections 11 are formed by the herringbone grooves 112. Therefore, a larger dynamic pressure effect can be obtained.

Third Embodiment

Figure 6:
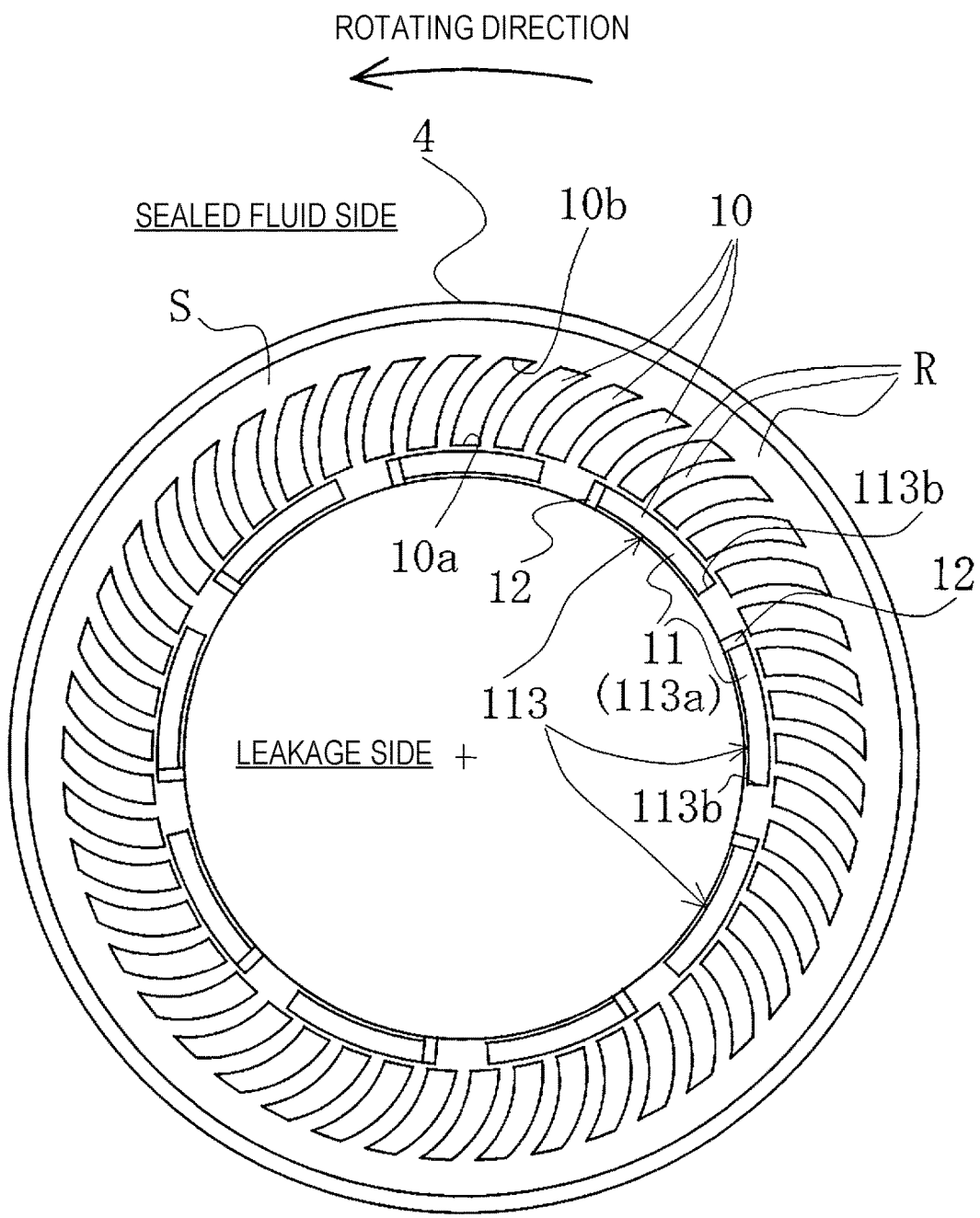
FIG. 6 is a view showing one of sealing faces of a slide component according to a third embodiment of the present invention, the view corresponding to FIG. 3 of the first embodiment.

With reference to FIG. 6, a slide component according to a third embodiment of the present invention will be described.

The slide component according to the third embodiment are different from the slide component of the first embodiment in terms of a configuration of independently-formed minute recessed sections 11 provided at positions on a sealing face between dynamic pressure generation grooves and the leakage side, the positions being separated in the radial direction from the dynamic pressure generation grooves. However, the other basic configurations are the same as the first embodiment. The same members will be given the same reference signs and duplicated description will be omitted.

In FIG. 6, a plurality of groove sections 113a that form the independently-formed minute recessed sections is provided on a sealing face IS between leakage-side ends 10a of dynamic pressure generation grooves 10 and the leakage side. The groove sections 113a are arranged at positions separated in the radial direction from the leakage-side ends 10a of the dynamic pressure generation grooves 10. Each of the groove sections 113a is formed in an arc shape having fixed width in the radial direction and extending in the circumferential direction, and forms a Rayleigh step mechanism 113 together with a radial deep groove 12. The depth of the groove section 113a is less than the depth of the radial deep groove 12.

Each of the minute groove sections 113a forms a Rayleigh step as shown in FIG. 4. When a rotating-side seal ring 4 relatively moves in the direction shown by the arrow, the groove sections suction the fluid from the leakage side via the radial deep grooves 12, and the suctioned fluid follows and moves in the arrow direction by viscosity thereof. At that time, due to existence of Rayleigh steps 113b of the Rayleigh step mechanisms 113, dynamic pressure (positive pressure) is generated. By the generation of this dynamic pressure, a gap between both the sealing faces is slightly extended, and the fluid on the leakage side is easily suctioned into the dynamic pressure generation grooves 10.

According to the configuration of the third embodiment described above, the following effects will be exhibited.

(1) The dynamic pressure generation grooves 10 are provided on the sealing face S of at least one of the pair of slide parts (sealing face S of the rotating-side seal ring 4) so as to be isolated with no communication from the side of the liquid serving as the sealed fluid and the leakage side by land portions R of both the sealing faces S, and the plurality of independently-formed groove sections 113a that form the minute recessed sections 11 is provided at the positions on the sealing face IS between the dynamic pressure generation grooves 10 and the leakage side, the positions being separated in the radial direction from the dynamic pressure generation grooves 10. Thereby, the slide component capable of making the sealing faces fluid-lubricant and low frictional and preventing leakage of the liquid serving as the sealed fluid and incoming of dust existing in the fluid on the leakage side to the sealing faces at the time of normal operation, so that contradictory functions of sealing and lubrication of the sealing faces are both improved can be provided. The dynamic pressure generation grooves 10 are isolated from the side of the liquid serving as the sealed fluid by the land portions R, and the groove sections 113a are arranged at the positions separated in the radial direction from the dynamic pressure generation grooves 10 and formed to be independent from each other. Thus, no leakage is generated even in a static state.

(2) The dynamic pressure generation grooves 10 are formed in a spiral shape to suction the fluid on the leakage side and pump the fluid to the side of the liquid serving as the sealed fluid. Thereby, the fluid on the leakage side is pumped to the side of the liquid serving as the sealed fluid at the time of normal operation, so that the liquid serving as the sealed fluid is prevented from leaking out to the leakage side.

(3) The independently-formed minute recessed sections are formed by the substantially-arc shape groove sections 113a that form the Rayleigh step mechanisms 113. Therefore, the groove sections 113a can be efficiently arranged, so that a larger dynamic pressure effect can be obtained.

Fourth Embodiment

Figure 7:
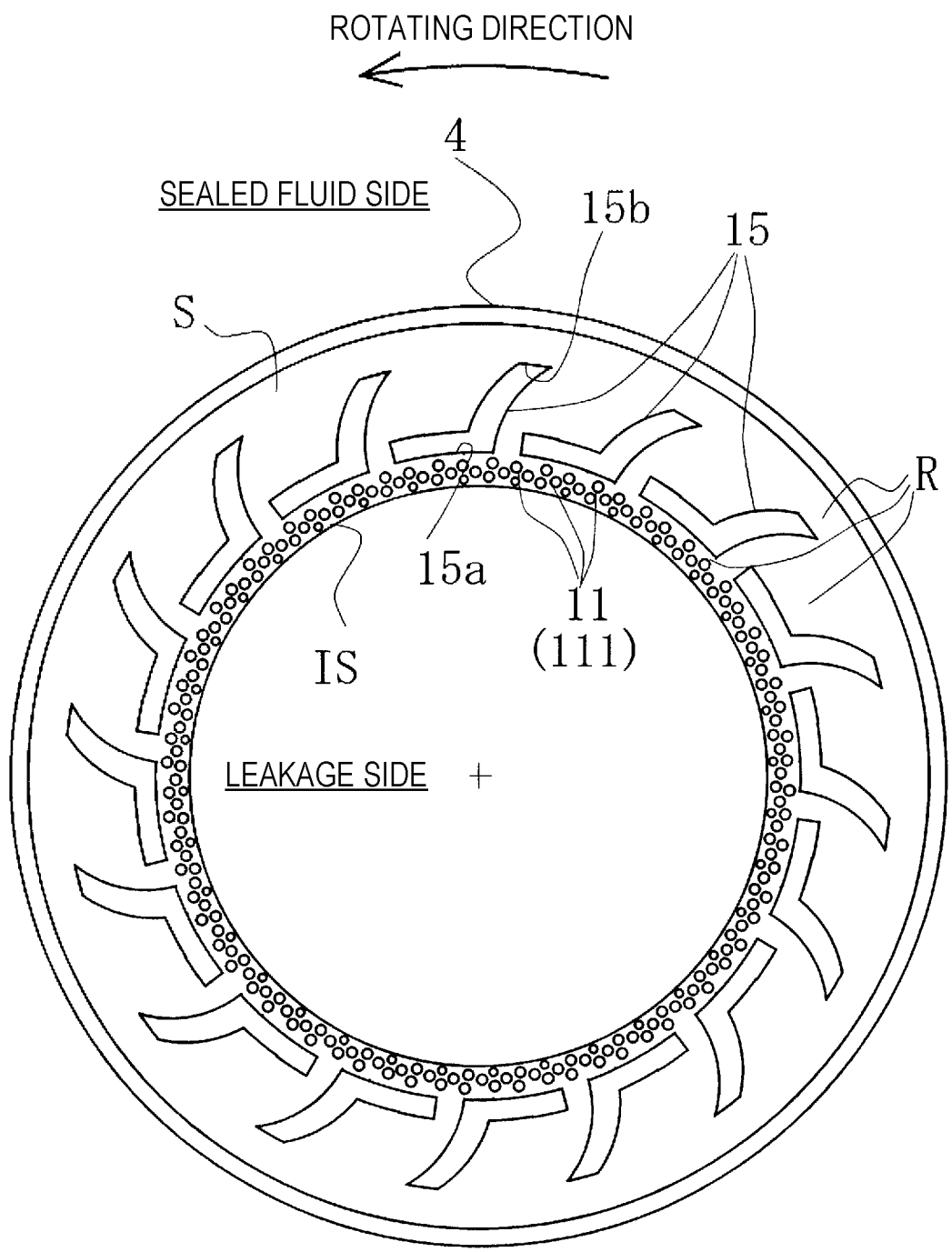
FIG. 7 is a view showing one of sealing faces of a slide component according to a fourth embodiment of the present invention, the view corresponding to FIG. 3 of the first embodiment.

With reference to FIG. 7, a slide component according to a fourth embodiment of the present invention will be described.

The slide component according to the fourth embodiment are different from the slide component of the first embodiment in terms of the shape of dynamic pressure generation grooves. However, the other basic configurations are the same as the first embodiment. The same members will be given the same reference signs and duplicated description will be omitted.

In FIG. 7, similar to the dynamic pressure generation grooves 10 of the first embodiment, a land portion R exists on the leakage side and the sealed fluid side in the radial direction of dynamic pressure generation grooves 15. Thus, the dynamic pressure generation grooves 15 are isolated with no communication from the sealed fluid side and the leakage side. The dynamic pressure generation grooves are inclined in a spiral shape so as to exhibit an operation of pumping from leakage-side ends 15a toward sealed fluid-side ends 15b by relative sliding between a rotating-side seal ring 4 and a stationary-side seal ring 7, so as to generate dynamic pressure (positive pressure) in the ends 15b. At that time, in a state where the rotating-side seal ring 4 is rotated at high speed such as normal operation, the spiral dynamic pressure generation grooves 15 suction a gas from the leakage side while being helped by an operation of dimples 111, and generate dynamic pressure (positive pressure) in the vicinity of the sealed fluid-side ends 15b. Thus, a slight gap is formed between sealing faces S of the rotating-side seal ring 4 and the stationary-side seal ring 7, so that the sealing faces S are brought into a gas lubricant state and becomes very low frictional.

The independently-formed and substantially-circular dimples 111 are arranged between the leakage-side ends 15a of the dynamic pressure generation grooves 15 and the leakage side while being apart from the ends 15a and the leakage side. Thus, the ends 15a and the leakage side do not directly communicate with each other, so that incoming of dust mixed in the fluid on the leakage side to the dynamic pressure generation grooves 15 can be suppressed. At the same time, supply of the fluid on the leakage side to the dynamic pressure generation grooves 15 is also suppressed.

Therefore, the dynamic pressure generation grooves 15 shown in FIG. 7 are formed in such a manner that the leakage-side ends 15a are extended long in the circumferential direction in comparison to the sealed fluid-side ends 15b, and leakage-side opening parts are enlarged. Thus, an effect of supplying the fluid to the dynamic pressure generation grooves 15 is increased.

The leakage-side ends 15a of the dynamic pressure generation grooves 15 are preferably extended to the upstream side in terms of increasing the effect of supplying the fluid. Radial width of the leakage-side ends 15a may be similar to width of the sealed fluid-side ends 15b.

According to the configuration of the fourth embodiment described above, the following effects will be exhibited in addition to the effects of the embodiments described above.

The leakage-side ends 15a of the dynamic pressure generation grooves 15 do not communicate with the leakage side, and incoming of dust mixed in the fluid on the leakage side to the dynamic pressure generation grooves 15 is suppressed, so that the effect of supplying the fluid to the dynamic pressure generation grooves 15 can be increased.

Fifth Embodiment

Next, with reference to FIG. 8, a slide component according to a fifth embodiment of the present invention will be described.

The slide component according to the fifth embodiment are different from the above embodiments in a point that fluid introduction grooves and positive pressure generation mechanisms are provided on the sealed fluid side on a sealing face of at least one of a pair of slide parts. However, the other basic configurations are the same as the embodiments. The same members will be given the same reference signs and duplicated description will be omitted.

In FIG. 8(a), on a sealing face S of a rotating-side seal ring 4, fluid introduction grooves 16 communicating with a peripheral edge on the sealed fluid side which is the outer peripheral side of the sealing face S and not communicating with a peripheral edge on the leakage side which is the inner peripheral side are provided.

One or more fluid introduction grooves 16 are arranged along the peripheral edge on the outer peripheral side and formed with the planar shape thereof being a substantially rectangular shape, communicate with the sealed fluid side at the peripheral edge on the outer peripheral side of the sealing face S, and are isolated from the inner peripheral side by land portions R.

Positive pressure generation mechanisms 17 each of which includes a positive pressure generation groove 17a communicating with a circumferentially downstream side part of the fluid introduction groove 16, the positive pressure generation groove being shallower than the fluid introduction groove 16, are also provided. The positive pressure generation mechanisms 17 are to increase a fluid film between the sealing faces by generating positive pressure (dynamic pressure) so as to improve a lubricating performance.

Upstream side parts of the positive pressure generation grooves 17a communicate with the fluid introduction grooves 16 and are isolated from the outer peripheral side by the land portions R.

In this example, each of the positive pressure generation mechanisms 17 is formed by a Rayleigh step mechanism including the positive pressure generation groove 17a whose upstream side part communicates with the fluid introduction groove 16 and a Rayleigh step 17b. However, the present invention is not limited to this but the point is that the positive pressure generation mechanisms are only required to be mechanisms that generate positive pressure.

In FIG. 8(a), the planar shape formed by the fluid introduction groove 16 and the positive pressure generation mechanism 17 is a substantially L shape.

Now, in a case where the rotating-side seal ring 4 is rotated anti-clockwise, the liquid on the outer peripheral side is introduced from the substantially rectangular fluid introduction grooves 16 to the sealing faces, so as to lubricate the sealing faces S. At that time, positive pressure (dynamic pressure) is generated by the positive pressure generation mechanisms 17. Thus, the fluid film between the sealing faces is increased, so that the lubricating performance can be further improved.

When the rotating-side seal ring 4 is rotated at high speed such as normal operation, the liquid introduced from the fluid introduction grooves 16 to the sealing faces is discharged by centrifugal force. Thus, the liquid does not leak out to the inner peripheral side which is the leakage side.

FIG. 8(b) is different from FIG. 8(a) in a point that the shape of fluid introduction grooves is different. However, the other points are the same as FIG. 8(a).

In FIG. 8(b), on a sealing face S of a rotating-side seal ring 4, fluid introduction grooves 18 communicating with a peripheral edge on the sealed fluid side which is the outer peripheral side of the sealing face S and not communicating with a peripheral edge on the leakage side which is the inner peripheral side are provided.

The fluid introduction grooves 18 are arranged along the peripheral edge on the outer peripheral side, each of the fluid introduction grooves is formed by a fluid introduction section 18a and a fluid ejection section 18b communicating only with the peripheral edge on the outer peripheral side of the sealing face S, and a fluid connection portion 18c providing communication between these sections in the circumferential direction, and the fluid introduction grooves are isolated from the inner peripheral side by land portions R.

In this example, the fluid introduction section 18a and the fluid ejection section 18b are spaced by a fixed distance in the circumferential direction and respectively linearly extended in the radial direction. Thus, the planar shape of the fluid introduction grooves 18 is a substantially U shape.

Positive pressure generation mechanisms 17 each of which includes a positive pressure generation groove 17a shallower than the fluid introduction groove 18 are also provided in a part surrounded by the fluid introduction grooves 18 and the outer peripheral side. The positive pressure generation mechanisms 17 are to increase a fluid film between the sealing faces by generating positive pressure (dynamic pressure) so as to improve a lubricating performance.

Upstream side parts of the positive pressure generation grooves 17a communicate with the fluid introduction sections 18a and the fluid ejection sections 18b and the outer peripheral side are isolated from each other by the land portions R.

In this example, each of the positive pressure generation mechanisms 17 is formed by a Rayleigh step mechanism including the positive pressure generation groove 17a whose upstream side part communicates with the fluid introduction section 18a of the fluid introduction groove 18 and a Rayleigh step 17b. However, the present invention is not limited to this but the point is that the positive pressure generation mechanisms are only required to be mechanisms that generate positive pressure.

Now, in a case where the rotating-side seal ring 4 is rotated clockwise, the liquid on the outer peripheral side is introduced from the fluid introduction sections 18a of the substantially U shape fluid introduction grooves 18 to the sealing faces and discharged from the fluid ejection sections 18b to the outer peripheral side. At that time, in a state where the rotating-side seal ring 4 is rotated at low speed such as the time of start-up, the liquid existing on the outer peripheral side of the sealing faces S is actively introduced to the sealing faces S so as to lubricate the sealing faces S. At that time, positive pressure (dynamic pressure) is generated by the positive pressure generation mechanisms 17. Thus, the fluid film between the sealing faces is increased, so that the lubricating performance can be further improved.

When the rotating-side seal ring 4 is rotated at high speed such as normal operation, the liquid introduced from the fluid introduction grooves 18 to the sealing faces is discharged by centrifugal force. Thus, the liquid does not leak out to the inner peripheral side which is the leakage side.

In FIG. 8(*b*), the planar shape of the fluid introduction grooves 18 is a substantially U shape. However, the present invention is not limited to this but the planar shape may be a shape in which the fluid introduction section 18*a* and the fluid ejection section 18*b* cross each other on the inner diameter side, that is, a substantially V shape.

According to the configuration of the fifth embodiment described above, the following effects will be exhibited in addition to the effects of the first embodiment.

On a sealing face S of the rotating-side seal ring 4, the fluid introduction grooves 16 or 18 communicating with the peripheral edge on the sealed fluid side which is the outer peripheral side of the sealing face S and not communicating with the peripheral edge on the leakage side which is the inner peripheral side are provided. Thereby, in a state where the rotating-side seal ring 4 is rotated at low speed such as the time of start-up, the liquid existing on the outer peripheral side of the sealing faces S is actively introduced to the sealing faces S so as to lubricate the sealing faces S. At that time, positive pressure (dynamic pressure) is generated by the positive pressure generation mechanisms 17. Thus, the fluid film between the sealing faces is increased, so that the lubricating performance can be further improved.

When the rotating-side seal ring 4 is rotated at high speed such as normal operation, the liquid introduced from the fluid introduction grooves 16 or 18 to the sealing faces is discharged by centrifugal force. Thus, the liquid does not leak out to the inner peripheral side which is the leakage side.

The embodiments of the present invention are described above with the drawings. However, specific configurations are not limited to these embodiments but modifications and additions that are made within the range not departing from the gist of the present invention are also included in the present invention.

For example, although the example that the slide parts are used for any of a pair of rotating and stationary seal rings in a mechanical seal device is described in the above embodiments, the slide parts can also be utilized as slide parts of a bearing that slides on a rotating shaft while sealing lubricating oil on one side in the axial direction of a cylindrical sealing face.

In addition, for example, the outer peripheral side of the slide parts serves as the sealed fluid side (liquid side or misty fluid side), and the inner peripheral side serves as the leakage side (gas side) in the description of the above embodiments. However, the present invention is not limited to this but can also be applied to a case where the outer peripheral side serves as the leakage side (gas side), and the inner peripheral side serves as the sealed fluid side (liquid side or misty fluid side). Regarding a relationship in terms of high/low pressure between the sealed fluid side (liquid side or misty fluid side) and the leakage side (gas side), for example, the sealed fluid side (liquid side or misty fluid side) may be high pressure and the leakage side (gas side) may be low pressure or vice versa, or the pressure may be the same on both the sides.

In addition, for example, although the case where the dynamic pressure generation groove 10 is a spiral groove is described in the above embodiments, the present invention is not limited to this but the dynamic pressure generation groove may be combination of a Rayleigh step and an inverse Rayleigh step. The point is that the dynamic pressure generation groove is only required to be a mechanism that suctions the fluid on the leakage side and generates dynamic pressure (positive pressure).

In addition, for example, the dimples 111, the herringbone grooves 112, and the Rayleigh steps 113*b* of the Rayleigh step mechanisms 113 are described regarding the minute recessed sections 11 in the above embodiments. However, the present invention is not limited to this but for example, the minute recessed sections may be parallel grooves or orthogonal grooves. Although the case where the shape of the dimples 111 is a substantially circular shape is described in the above embodiments, the present invention is not limited to this but for example, the shape may be an oval shape, an oblong shape, or a rectangular shape.

In addition, for example, the case where the dynamic pressure generation grooves 15 whose leakage-side opening parts are enlarged are applied to the first embodiment is described in the fourth embodiment. However, the present invention is not limited to this but the dynamic pressure generation grooves 15 can also be applied to the second and third embodiments needless to say.

In addition, for example, the case where the fluid introduction grooves and the positive pressure generation grooves provided on the sealed fluid side on the sealing face are applied to the first embodiment is described in the fifth embodiment. However, the present invention is not limited to this but the above grooves can also be applied to the second, third, and fourth embodiments needless to say.

REFERENCE SIGN LIST

1 Impeller
2 Rotating shaft
3 Sleeve
4 Rotating-side seal ring
5 Housing
6 Cartridge
7 Rotating-side seal ring
8 Coiled wave spring
10 Dynamic pressure generation groove
10*a* Leakage-side end
10*b* Sealed fluid-side end
11 Minute recessed section
111 Dimple
112 Herringbone groove (minute recessed section)
112*a* Rayleigh step
113 Rayleigh step mechanism
113*a* Groove section
113*b* Rayleigh step
12 Radial deep groove
15 Dynamic pressure generation groove
16 Fluid introduction groove
17 Positive pressure generation mechanism
18 Fluid introduction groove
S Sealing face
IS Sealing face between leakage-side end of dynamic pressure generation groove and leakage side
R Land portion

The invention claimed is:

1. A slide component comprising a pair of slide parts that relatively slide on each other, one of the slide parts being a stationary-side seal ring and the other slide part being a rotating-side seal ring, wherein one of an outer peripheral side or an inner peripheral side of the pair of slide parts in a radial direction serves as a sealed fluid side, and the other of the outer peripheral side or the inner peripheral side of the pair of slide parts serves as a leakage side, the stationary-side and rotating-side seal rings having sealing faces, respectively, formed in the radial direction to seal leakage of a sealed fluid from the sealed fluid side to the leakage side, characterized in that:

a dynamic pressure generation groove is provided on the sealing face of at least one of the pair of slide parts, and a land portion is provided on each of an inner-diameter side and an outer-diameter side of the dynamic pressure generation groove, the sealing face of the other of the pair of the slide parts has, in a radial direction, (i) an inner diameter which is set smaller than a diameter of an inner diameter-side end of the dynamic pressure generation groove, and (ii) an outer diameter which is set larger than a diameter of an outer diameter-side end of the dynamic pressure generation groove, the sealing face of the other of the pair of the slide parts is slidably in contact with the land portion on each of the inner-diameter side and the outer-diameter side of the dynamic pressure generation groove of the one of the pair of the slide parts, in a manner that, in a static state, the dynamic pressure generation groove is isolated from a sealed fluid side without fluid communication with the sealed fluid side and is isolated from the leakage side without fluid communication with the leakage side; and a plurality of independently-formed minute recessed sections is provided at positions on the sealing face between the dynamic pressure generation groove and the leakage side, the positions being separated in the radial direction from the dynamic pressure generation groove.

2. The slide component as set forth in claim 1, characterized in that:
the dynamic pressure generation groove is formed in a spiral shape to suction the fluid on the leakage side and pump the fluid to the sealed fluid side.

3. The slide component as set forth in claim 2, characterized in that:
the independently-formed minute recessed sections are formed by dimples.

4. The slide component as set forth in claim 2, characterized in that:
the independently-formed minute recessed sections are formed by herringbone grooves.

5. The slide component as set forth in claim 2, characterized in that:
the independently-formed minute recessed sections are formed by groove sections that form Rayleigh step mechanisms.

6. The slide component as set forth in claim 2, characterized in that:
the dynamic pressure generation groove is formed in such a manner that a leakage-side end is extended long in the circumferential direction in comparison to a sealed fluid-side end, and a leakage-side opening part is enlarged.

7. The slide component as set forth in claim 2, characterized in that:
a fluid introduction groove communicating with the sealed fluid side and not communicating with the leakage side is provided on the sealing face of at least one of the pair of slide parts.

8. The slide component as set forth in claim 1, characterized in that:
the independently-formed minute recessed sections are formed by dimples.

9. The slide component as set forth in claim 8, characterized in that:
the dynamic pressure generation groove is formed in such a manner that a leakage-side end is extended long in the circumferential direction in comparison to a sealed fluid-side end, and a leakage-side opening part is enlarged.

10. The slide component as set forth in claim 1, characterized in that:
the independently-formed minute recessed sections are formed by herringbone grooves.

11. The slide component as set forth in claim 1, characterized in that:
the independently-formed minute recessed sections are formed by groove sections that form Rayleigh step mechanisms.

12. The slide component as set forth in claim 1, characterized in that:
the dynamic pressure generation groove is formed in such a manner that a leakage-side end is extended long in the circumferential direction in comparison to a sealed fluid-side end, and a leakage-side opening part is enlarged.

13. The slide component as set forth in claim 1, characterized in that:
a fluid introduction groove communicating with the sealed fluid side and not communicating with the leakage side is provided on the sealing face of at least one of the pair of slide parts.

14. A slide component comprising a pair of slide parts that relatively slide on each other, one of the slide parts being a stationary-side seal ring and the other slide part being a rotating-side seal ring, wherein one of an outer peripheral side or an inner peripheral side of the pair of slide parts in a radial direction serves as a sealed fluid side, and the other of the outer peripheral side or the inner peripheral side of the pair of slide parts serves as a leakage side, the stationary-side and rotating-side seal rings having sealing faces, respectively, formed in the radial direction to seal leakage of a liquid or a misty fluid serving as a sealed fluid from the sealed fluid side to the leakage side, characterized in that:

a dynamic pressure generation groove is provided on the sealing face of at least one of the pair of slide parts, and a land portion is provided on each of an inner-diameter side and an outer-diameter side of the dynamic pressure generation groove, the sealing face of the other of the pair of the slide parts has, in a radial direction, (i) an inner diameter which is set smaller than a diameter of an inner diameter-side end of the dynamic pressure generation groove, and (ii) an outer diameter which is set larger than a diameter of an outer diameter-side end of the dynamic pressure generation groove, the sealing face of the other of the pair of the slide parts is slidably in contact with the land portion on each of the inner-diameter side and the outer-diameter side of the dynamic pressure generation groove of the one of the pair of the slide parts, in a manner that, in a static state, the dynamic pressure generation groove is isolated from a sealed fluid side without fluid communication with the sealed fluid side and is isolated from the leakage side without fluid communication with the leakage side; and a plurality of independently-formed minute recessed sections is provided at positions on the sealing face between the dynamic pressure generation groove and the leakage side, the positions being separated in the radial direction from the dynamic pressure generation groove.

15. The slide component as set forth in claim 14, characterized in that:
the dynamic pressure generation groove is formed in a spiral shape to suction the fluid on the leakage side and pump the fluid to the sealed fluid side.

16. The slide component as set forth in claim 14, characterized in that:
the independently-formed minute recessed sections are formed by dimples.

17. The slide component as set forth in claim 14, characterized in that:
the independently-formed minute recessed sections are formed by herringbone grooves.

18. The slide component as set forth in claim 14, characterized in that:
the independently-formed minute recessed sections are formed by groove sections that form Rayleigh step mechanisms.

19. The slide component as set forth in claim 14, characterized in that:
the dynamic pressure generation groove is formed in such a manner that a leakage-side end is extended long in the circumferential direction in comparison to a sealed fluid-side end, and a leakage-side opening part is enlarged.

20. The slide component as set forth in claim 14, characterized in that:
a fluid introduction groove communicating with the sealed fluid side and not communicating with the leakage side is provided on the sealing face of at least one of the pair of slide parts.

* * * * *